(12) United States Patent
Rowitch (10) Patent No.: US 8,478,228 B2
(45) Date of Patent: Jul. 2, 2013

(54) MOBILE RECEIVER WITH LOCATION SERVICES CAPABILITY

(75) Inventor: Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 12/254,769

(22) Filed: Oct. 20, 2008

(65) Prior Publication Data

US 2010/0099375 A1    Apr. 22, 2010

(51) Int. Cl.
*H04M 11/04*    (2006.01)

(52) U.S. Cl.
USPC .......... 455/404.2; 455/456.1; 455/67.11; 455/423; 455/552.1; 370/328; 370/338

(58) Field of Classification Search
USPC ............ 455/404.1–404.2, 456.1–457, 41.2, 455/552.1; 370/328, 338
See application file for complete search history.

(56) References Cited

U.S. PATENT DOCUMENTS

| | | | |
|---|---|---|---|
| 4,112,421 A | 9/1978 | Freeny, Jr. | |
| 4,567,483 A | 1/1986 | Bateman et al. | |
| 5,075,693 A | 12/1991 | McMillan et al. | |
| 5,515,419 A | 5/1996 | Sheffer | |
| 5,537,460 A | 7/1996 | Holliday, Jr. et al. | |
| 5,570,412 A | 10/1996 | LeBlanc | |
| 5,588,848 A | 12/1996 | Law et al. | |
| 5,608,410 A | 3/1997 | Stilp et al. | |
| 5,613,205 A | 3/1997 | Dufour | |
| 5,657,487 A | 8/1997 | Doner | |
| 5,706,333 A | 1/1998 | Grenning et al. | |
| 5,717,406 A | 2/1998 | Sanderford et al. | |
| 5,731,786 A | 3/1998 | Abraham et al. | |
| 5,736,957 A | 4/1998 | Raney | |
| 5,812,087 A | 9/1998 | Krasner | |
| 5,841,396 A | 11/1998 | Krasner | |
| 5,873,040 A | 2/1999 | Dunn et al. | |
| 5,874,914 A | 2/1999 | Krasner | |
| 5,883,598 A | 3/1999 | Parl et al. | |
| 5,945,944 A | 8/1999 | Krasner | |
| 5,960,341 A | 9/1999 | LeBlanc et al. | |
| 5,969,669 A | 10/1999 | Ishikawa et al. | |
| 5,987,306 A | 11/1999 | Nilsen et al. | |

(Continued)

FOREIGN PATENT DOCUMENTS

| EP | 0930514 A2 | 7/1999 |
|---|---|---|
| EP | 1008862 A1 | 6/2000 |

(Continued)

OTHER PUBLICATIONS

International Search Report/Written Opinion—PCT/US09/061225-International Search Authority EPO—Mar. 18, 2010.

(Continued)

*Primary Examiner* — Sharad Rampuria
(74) *Attorney, Agent, or Firm* — Jennifer M. Pascua (57) ABSTRACT

The subject matter disclosed herein relates to a receiver that is capable of processing signals which are transmitted according to one or more wireless communication protocols. Such a receiver may have sufficient resources to obtain acquisition information from a signal transmitted according to at least one of the wireless communication protocols during an acquisition period and for the purpose of obtaining an estimate of a location of the receiver.

22 Claims, 4 Drawing Sheets

U.S. PATENT DOCUMENTS

| | | |
|---|---|---|
| 5,999,124 A | 12/1999 | Sheynblat |
| 6,014,102 A | 1/2000 | Mitzlaff et al. |
| 6,061,018 A | 5/2000 | Sheynblat |
| 6,122,266 A | 9/2000 | Lynch |
| 6,128,501 A | 10/2000 | Ffoulkes-Jones |
| 6,161,018 A | 12/2000 | Reed et al. |
| 6,166,685 A | 12/2000 | Soliman |
| 6,167,275 A | 12/2000 | Oros et al. |
| 6,175,500 B1 | 1/2001 | Roy |
| 6,188,354 B1 | 2/2001 | Soliman et al. |
| 6,208,290 B1 | 3/2001 | Krasner |
| 6,215,441 B1 | 4/2001 | Moeglein et al. |
| 6,215,442 B1 | 4/2001 | Sheynblat et al. |
| 6,216,064 B1 | 4/2001 | Johnson et al. |
| 6,222,483 B1 | 4/2001 | Twitchell et al. |
| 6,230,018 B1 | 5/2001 | Watters et al. |
| 6,236,365 B1 | 5/2001 | LeBlanc et al. |
| 6,243,587 B1 | 6/2001 | Dent et al. |
| 6,243,591 B1 | 6/2001 | Takemura |
| 6,246,861 B1 | 6/2001 | Messier et al. |
| 6,249,252 B1 | 6/2001 | Dupray |
| 6,263,208 B1 | 7/2001 | Chang et al. |
| 6,275,707 B1 | 8/2001 | Reed et al. |
| 6,313,786 B1 | 11/2001 | Sheynblat et al. |
| 6,313,787 B1 | 11/2001 | King et al. |
| 6,314,294 B1 | 11/2001 | Benveniste |
| 6,330,628 B1 | 12/2001 | Motoyama |
| 6,353,412 B1 | 3/2002 | Soliman |
| 6,362,778 B2 | 3/2002 | Neher |
| 6,393,294 B1 | 5/2002 | Perez-Breva et al. |
| 6,433,735 B1 | 8/2002 | Bloebaum et al. |
| 6,438,382 B1 | 8/2002 | Boesch et al. |
| 6,445,927 B1 | 9/2002 | King et al. |
| 6,466,797 B1 | 10/2002 | Frodigh et al. |
| 6,466,938 B1 | 10/2002 | Goldberg |
| 6,490,313 B1 | 12/2002 | Ganesh et al. |
| 6,501,955 B1 | 12/2002 | Durrant et al. |
| 6,526,039 B1 | 2/2003 | Dahlman et al. |
| 6,529,164 B1 | 3/2003 | Carter |
| 6,538,601 B2 | 3/2003 | Bruno et al. |
| 6,556,829 B1 | 4/2003 | Persson |
| 6,590,530 B2 | 7/2003 | Van Diggelen et al. |
| 6,603,966 B1 | 8/2003 | Sheffield |
| 6,628,944 B1 | 9/2003 | Jeong et al. |
| 6,636,740 B1 | 10/2003 | Ramesh |
| 6,636,744 B1 | 10/2003 | Da |
| 6,684,158 B1 | 1/2004 | Garin et al. |
| 6,707,422 B2 | 3/2004 | Sheynblat et al. |
| 6,754,470 B2 | 6/2004 | Hendrickson et al. |
| 6,757,544 B2 | 6/2004 | Rangarajan et al. |
| 6,799,050 B1 | 9/2004 | Krasner |
| 6,799,054 B2* | 9/2004 | Shpak ............................ 455/525 |
| 6,806,830 B2 | 10/2004 | Panasik et al. |
| 6,865,395 B2 | 3/2005 | Riley |
| 6,895,249 B2 | 5/2005 | Gaal |
| 6,898,197 B1 | 5/2005 | Lavean |
| 6,941,145 B2 | 9/2005 | Ogino et al. |
| 6,957,072 B2 | 10/2005 | Kangras et al. |
| 6,970,795 B1 | 11/2005 | Burgett et al. |
| 7,065,351 B2 | 6/2006 | Carter et al. |
| 7,072,316 B2 | 7/2006 | Proctor, Jr. et al. |
| 7,084,809 B2 | 8/2006 | Hockley, Jr. et al. |
| 7,123,928 B2 | 10/2006 | Moeglein et al. |
| 7,127,257 B2 | 10/2006 | Riley et al. |
| 7,203,497 B2* | 4/2007 | Belcea ............................ 455/446 |
| 7,209,758 B1 | 4/2007 | Moll et al. |
| 7,239,272 B2 | 7/2007 | Vyas et al. |
| 7,286,515 B2* | 10/2007 | Olson et al. .................... 370/338 |
| 7,359,706 B2 | 4/2008 | Zhao |
| 7,363,028 B2* | 4/2008 | de Clerq et al. .............. 455/414.1 |
| 7,383,049 B2 | 6/2008 | Deloach, Jr. et al. |
| 7,558,852 B2* | 7/2009 | Douglas et al. ................. 709/224 |
| 7,660,588 B2 | 2/2010 | Sheynblat et al. |
| 7,751,829 B2* | 7/2010 | Masuoka et al. ............. 455/456.1 |
| 7,821,986 B2* | 10/2010 | Thomson et al. ............... 370/328 |
| 7,936,736 B2* | 5/2011 | Proctor et al. ................. 370/338 |
| 8,144,673 B2 | 3/2012 | Alizadeh-Shabdiz |
| 8,150,421 B2* | 4/2012 | Ward et al. .................. 455/456.5 |
| 8,204,512 B2* | 6/2012 | Dietrich et al. .............. 455/456.2 |
| 8,244,274 B2* | 8/2012 | Grigsby et al. .............. 455/456.1 |
| 2001/0022558 A1 | 9/2001 | Karr, Jr. et al. |
| 2001/0034223 A1 | 10/2001 | Rieser et al. |
| 2001/0041566 A1 | 11/2001 | Xanthos et al. |
| 2002/0022482 A1 | 2/2002 | Ishikawa |
| 2002/0025822 A1 | 2/2002 | Hunzinger |
| 2002/0065107 A1 | 5/2002 | Harel et al. |
| 2002/0076951 A1 | 6/2002 | Roy |
| 2002/0076952 A1 | 6/2002 | Roy |
| 2002/0076958 A1 | 6/2002 | Roy et al. |
| 2002/0095486 A1* | 7/2002 | Bahl ............................ 709/223 |
| 2002/0131255 A1 | 9/2002 | Roy |
| 2002/0137404 A1 | 9/2002 | Roy |
| 2002/0175855 A1 | 11/2002 | Richton et al. |
| 2002/0193946 A1 | 12/2002 | Turnbull |
| 2003/0007468 A1 | 1/2003 | Joshi et al. |
| 2003/0048758 A1 | 3/2003 | Jones et al. |
| 2003/0068977 A1 | 4/2003 | King |
| 2003/0083064 A1 | 5/2003 | Cooper |
| 2003/0095527 A1 | 5/2003 | Shanbhag |
| 2003/0125045 A1 | 7/2003 | Riley et al. |
| 2003/0129987 A1 | 7/2003 | Tanay et al. |
| 2003/0134648 A1 | 7/2003 | Reed et al. |
| 2003/0190919 A1 | 10/2003 | Niemenmaa |
| 2003/0195008 A1 | 10/2003 | Mohi et al. |
| 2004/0034471 A1 | 2/2004 | Rorabaugh |
| 2004/0110518 A1 | 6/2004 | Swift et al. |
| 2004/0180670 A1 | 9/2004 | Pande et al. |
| 2004/0203727 A1 | 10/2004 | Abiri et al. |
| 2004/0263386 A1 | 12/2004 | King et al. |
| 2005/0070304 A1 | 3/2005 | Farchmin et al. |
| 2005/0090266 A1 | 4/2005 | Sheynblat |
| 2005/0113107 A1* | 5/2005 | Meunier ....................... 455/456.1 |
| 2006/0030290 A1* | 2/2006 | Rudolf et al. ............... 455/404.1 |
| 2006/0211431 A1 | 9/2006 | Mansour et al. |
| 2006/0232466 A1 | 10/2006 | Park et al. |
| 2006/0276202 A1 | 12/2006 | Moeglein et al. |
| 2007/0042790 A1 | 2/2007 | Mohi et al. |
| 2007/0053474 A1 | 3/2007 | Kim |
| 2007/0139267 A1 | 6/2007 | Black et al. |
| 2007/0258421 A1 | 11/2007 | Alizadeh-Shabdiz et al. |
| 2008/0008118 A1 | 1/2008 | Alizadeh-Shabdiz |
| 2008/0032706 A1 | 2/2008 | Sheynblat et al. |
| 2008/0096579 A1 | 4/2008 | Gill |
| 2008/0242312 A1 | 10/2008 | Paulson et al. |
| 2008/0280624 A1 | 11/2008 | Wrappe |
| 2008/0294334 A1 | 11/2008 | Jo et al. |
| 2009/0146870 A1 | 6/2009 | Thome et al. |
| 2009/0225743 A1 | 9/2009 | Nicholls et al. |
| 2010/0073229 A1 | 3/2010 | Pattabiraman et al. |
| 2010/0093377 A1 | 4/2010 | Riley et al. |
| 2011/0028166 A1 | 2/2011 | Ketchum et al. |
| 2011/0263219 A1* | 10/2011 | Hasenfang et al. ......... 455/404.2 |

FOREIGN PATENT DOCUMENTS

| | | |
|---|---|---|
| EP | 1122554 A1 | 8/2001 |
| EP | 2015535 A1 | 1/2009 |
| GB | 2364617 | 1/2002 |
| JP | 5336564 A | 12/1993 |
| JP | 8237729 A | 9/1996 |
| JP | 9261159 A | 10/1997 |
| JP | 1070752 | 3/1998 |
| JP | 2001112050 A | 4/2001 |
| JP | 2002152104 | 5/2002 |
| JP | 2002518684 A | 6/2002 |
| JP | 2002300100 A | 10/2002 |
| JP | 2003296152 A | 10/2003 |
| JP | 2004166056 A | 6/2004 |
| JP | 2005020053 A | 1/2005 |
| JP | 2005535901 T | 11/2005 |
| JP | 2007506099 A | 3/2007 |
| JP | 2008501260 A | 1/2008 |
| JP | 2009545752 | 12/2009 |
| KR | 1020050050641 | 5/2005 |
| WO | WO9603679 A1 | 2/1996 |
| WO | WO9631076 | 10/1996 |
| WO | WO9642179 A1 | 12/1996 |
| WO | WO9705722 A2 | 2/1997 |

| | | |
|---|---|---|
| WO | WO9944375 A1 | 9/1999 |
| WO | WO0038460 A1 | 6/2000 |
| WO | WO0133302 | 5/2001 |
| WO | WO0150151 A1 | 7/2001 |
| WO | WO0173466 A1 | 10/2001 |
| WO | WO0184862 | 11/2001 |
| WO | WO0199444 A1 | 12/2001 |
| WO | WO0223215 | 3/2002 |
| WO | WO0251192 A1 | 6/2002 |
| WO | WO03010552 A2 | 2/2003 |
| WO | WO03019835 A1 | 3/2003 |
| WO | WO03058986 A2 | 7/2003 |
| WO | WO2004102865 A1 | 11/2004 |
| WO | 2008016901 A2 | 2/2008 |
| WO | WO2009017877 | 2/2009 |

OTHER PUBLICATIONS

3GPP2 C.S0010-C. "Recommended Minimum Performance Standards for cdma2000 Spread Spectrum Base Stations," version 1.0, Release C, Jan. 14, 2005.

3GPP2 C.S0010-C. "Recommended Minimum Performance Standards for cdma2000 Spread Spectrum Base Stations," version 2.0, Release C, Feb. 24, 2006.

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIS/IS-801-1).

Biacs, et al., "The Qualcomm/Snaptrack Wireless-Assisted GPS Hybrid Positioning System and Reults from Initial Commercial Deployments" Proceedings of the Institute of Navigation, ION GPS 2002, Online, Sep. 24, 2002, pp. 378-384.

GSM 04.31, V8.1.0 (Apr. 2000), Digital Cellular Telecommunications System (Phase 2+); Location Services (LCS); Mobile Station (MS)—Serving Mobile Location Centre (SMLC) Radio Resource LCS Protocol (RRLP) (GSM 04.31 version 8.1.0 Release 1999).

Savarese C et al: "Locationing in distributed ad-hoc wireless sensor networks" 2001 IEEE International Conference on Acoustics, Speech, and Signal.

Processing. Proceedings. (ICASSP). Salt Lake City, UT, May 7-11, 2001, IEEE International Conference on Acoustics, Speech, and Signal Processing (ICASSP), New York, NY: IEEE, US, vol. 4 of 6, May 7, 2001, pp. 2037-2040, XP002225743 ISBN: 0-7803-7041-4.

Telecommunications Industry Association, Mobile Station-Base Station Compatibility Standard for Dual-Mode Wideband Spread Spectrum Cellular System, TIA/EIA-95, Jul. 1993, 668 pages.

TIA/856-A; "CDMA2000 High Rate Packet Data Air Interface Specification" (Apr. 2004).

TIA/EIA J-STD-036-A, "Enhanced Wireless 9 1 1, Phase 2", TIA: Published Jun. 2002.

TIA/EIA-95-B "Mobile Station-Base Station Compatibility Standard for Wideband Spread Spectrum Cellular Systems", Mar. 1999, XP-002145331.

TIA/EIA/IS-2000—Introduction to cdma2000 Standards for Spread Spectrum Systems; Physical Layer Standard for cdma2000 Spread Spectrum Systems; Medium Access Control (MAC) Standard for cdma2000 Spread Spectrum Systems; Signaling Link Access Control (LAC) Standard for cdma2000 Spread Spectrum Systems; Upper Layer (Layer 3) Signaling Standard for cdma2000 Spread Spectrum Systems; Analog Signaling Standard for cdma2000 Spread Spectrum Systems (V.1.0, Release C, May 28, 2002).

* cited by examiner

MOBILE RECEIVER WITH LOCATION SERVICES CAPABILITY

BACKGROUND

1. Field

The subject matter disclosed herein relates to a low-cost receiver for processing signals from a wireless communication link to provide location services.

2. Information

Mobile communication devices, such as cell phones, personal digital assistants (PDAs) and/or the like, typically communicate with one or more base stations in a cellular network according to one or more wireless communication protocols. In some implementations, such a mobile communication device may also have the capability to communicate with other devices over shorter wireless communication links using different wireless communication protocols such as, for example, protocols used in a wireless LAN (WLAN) (e.g., versions of IEEE Std. 802.11) and/or protocols used in a wireless personal area network (WPAN) (e.g., versions of IEEE Std. 802.15 such as Bluetooth, ultra wideband or ZigBee). Including capabilities for communicating according to multiple communication protocols typically adds cost to manufacture of mobile communication devices.

BRIEF DESCRIPTION OF THE FIGURES

Non-limiting and non-exhaustive features will be described with reference to the following figures, wherein like reference numerals refer to like parts throughout the various figures

SUMMARY

In one particular example, although claimed subject matter is not limited in this respect, a receiver adapted to process information transmitted according to a wireless communication protocol where the wireless communication protocol defines an acquisition period for transmission of acquisition information. In one particular implementation, the receiver is capable of storing acquisition information transmitted during the acquisition period for the purpose of determining a location of the receiver. It should be understood, however, that this is merely one example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth, Ultra Wideband (UWB), ZigBee or other network according to IEEE 802.15x, for example. Such location determination techniques described herein may also be used for any combination of WWAN, WLAN and/or WPAN.

Figure 1:
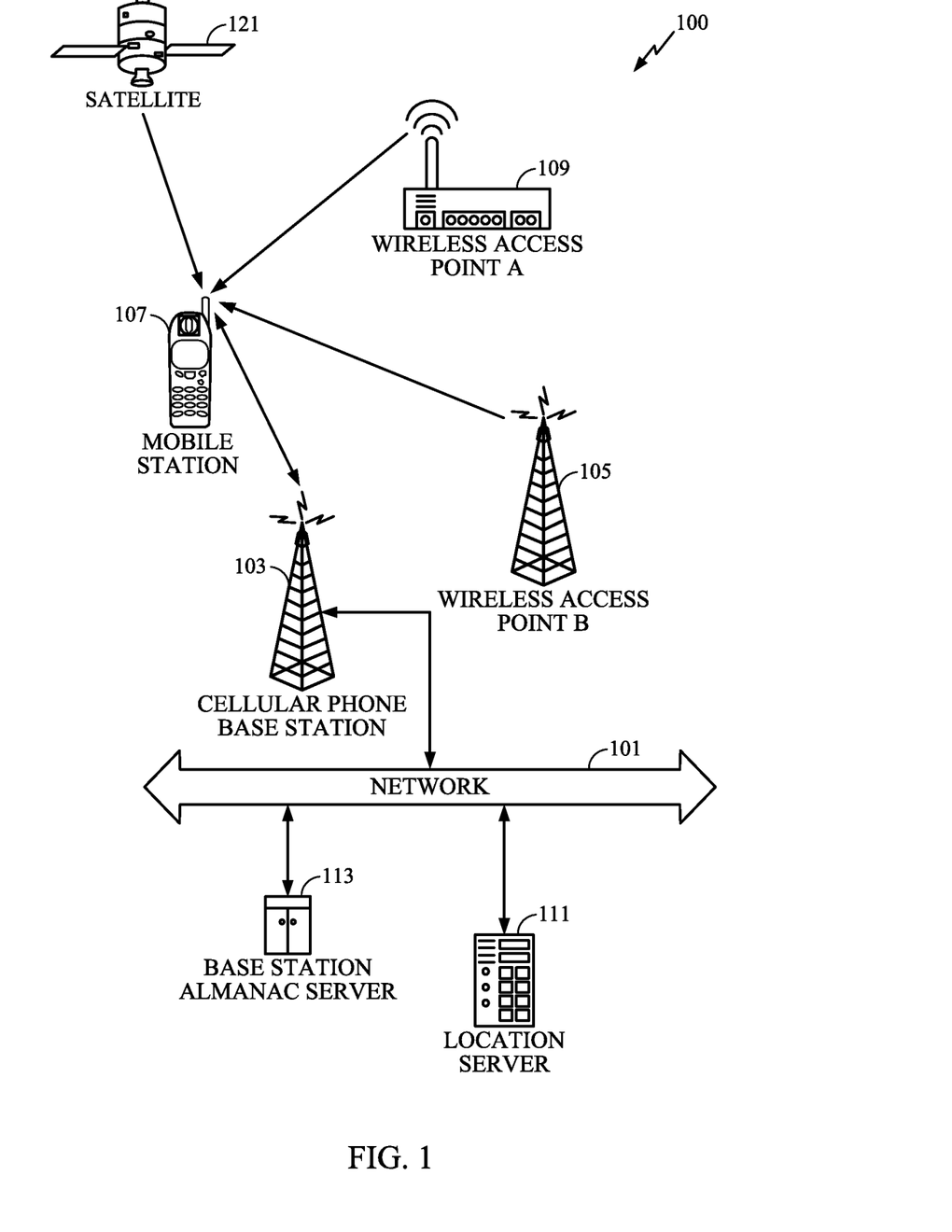
FIG. 1 is a schematic diagram of a communication network adapted to communicate with a mobile station over wireless links according to one aspect.

In one aspect, determining a location of a mobile station may be useful in many applications such as, for example, in emergency applications where location of a mobile station (MS) may be used for transporting emergency resources in a time efficient manner (e.g., in response to a "911" distress call). Here, for example, a MS may determine its location using any one of several techniques such as, for example, processing navigation signals received from a satellite positioning system (SPS) such as the Global Positioning System (GPS), Galileo and Glonass SPS', just to name a few examples, using techniques known to those of ordinary skill in the art. In FIG. 1, for example, MS 107 may process navigation signals received from a satellite 121 to, among other things, determine a pseudorange measurement to satellite 121. Here, with determination of pseudorange measurements to four or more such satellites, and with an accurate estimate of orbital positions of such satellites when such pseudorange measurements are determined, a location of MS 107 may be estimated. MS 107 may comprise any one of several mobile communication devices such as, for example, a mobile telephone, personal digital assistant (PDA), personal navigation device, notebook computer, just to name a few examples.

In one implementation, MS 107 may be capable of communicating with devices on network 101 such as a base station almanac server 113 and location server 111 through cellular base station 103 using one or more of the aforementioned cellular communication protocols. Here, for example, MS 107 may communicate with base station almanac server 113 to obtain, for example, acquisition assistance information and/or information regarding the positions of satellites which are "in view" of MS 107. In an alternative implementation, base station almanac server 113 may be replaced with a base station almanac database (not shown) that is located at and/or accessible through location server 111. As such, MS 107 may access such acquisition assistance and/or information regarding satellite positions through accessing location server 111. Also, MS 107 may communicate with location server 111 to, for example, provide information indicating an estimate of the location of MS 107.

In some environments, processing of navigation signals from satellites for determining pseudorange measurements may be difficult or impossible. Such environments may include, for example, high multi-path urban environments and/or indoor environments. In one particular implementation, a MS may obtain information from other sources that can be used in estimating a location of the MS. For example, the location of MS 107 may be estimated based, at least in part, on signals received from terrestrial transmitters such as wireless access point 109 and/or wireless access point 105.

In one implementation, wireless access point 109 may transmit and/or receive information according to a wireless communication protocol for use in a WLAN, such as versions of IEEE Std. 802.11. In alternative implementations, MS 107 may transmit and/or receive information according to a wireless communication protocol for use in a WPAN, such as versions of IEEE Std. 802.15. Also, the location of wireless access point 109 may be known and recorded at, for example, a memory location at MS 107, almanac server 113 and/or location server 111. In one particular implementation, wireless access point 109 may transmit unique identification information uniquely associated with wireless access point 109 such as, for example, a media access control (MAC) address during an acquisition period. Here, if MS 107 is within range to "acquire" signals transmitted from wireless access point 109 during an acquisition period and obtain a MAC address associated with wireless access point 109, it can be determined (e.g., at location server 111 or MS 107) that MS 107 is in proximity (e.g., within acquisition range) of wireless access point 109. Having knowledge of the location of wireless access point 109 may then provide an estimate of the location of MS 107 based, at least in part, on the known location of wireless access point 109. A location of MS 107 may also be estimated based, at least in part, on measurements from two or more access points, such as access point 109 and one other access point (not shown), using location estimation techniques known to those of ordinary skill in the art.

As pointed out above, MS 107 may be adapted to communicate with cellular base station 103 to, among other things, transmit and/or received voice traffic, data and/or the like in support of a particular voice and/or data service. In certain implementations, MS 107 may also be adapted to at least receive information according to one of the aforementioned short range wireless communication protocols (e.g., versions of IEEE Std. 802.11 and/or IEEE Std. 802.15) solely for the purpose of receiving a MAC address transmitted by an access point during acquisition. In one implementation, MS 107 may "acquire" a signal from wireless access point 109 during an "acquisition period." During such an acquisition period, for example, a MS 107 may obtain sufficient information from a wireless signal to enable subsequent processing to estimate a location of MS 107. Such "acquisition information" obtained during an acquisition period may include, for example, information relating to a carrier frequency, RF phase, a code, a code-phase, timing, Doppler shift and/or measurement of received signal strength, just to name a few examples. In particular implementations, although claimed subject matter is not limited in this respect, such acquisition information obtained in an acquisition period may also include information identifying a transmitter and/or device which is transmitting an acquired signal (e.g., a MAC address).

In some implementations of a wireless communication protocol such as the aforementioned versions of IEEE Std. 802.11 or IEEE Std. 802.15, upon successfully completing acquisition of a wireless signal, a portable wireless device may communicate further with the wireless communication network in a communication "session." During such a communication session, for example, information may be transmitted between a portable wireless device and a wireless communication network according to a predefined format such as frames and/or data packets (e.g., according to the Internet Protocol in some particular implementations). To establish and/or maintain such communication session, such a portable wireless device may comprise sufficient processing resources such as, for example memory and/or logic, to process information received in the course of a communication session and/or process information for transmission over a wireless data link according to a wireless communication protocol.

By being configured and/or adapted to operate a receiver and/or transceiver for one of the aforementioned versions of IEEE Std. 802.11 or IEEE Std. 802.15 solely for the purpose of obtaining a MAC address and/or measuring received signal strength during an acquisition period, MS 107 need not provide full functionality for communicating in a session. By allowing MS 107 to be configured for such a reduced functionality (e.g., merely for obtaining a MAC address and/or measuring received signal strength) during an acquisition period), MS 107 may manufactured at a cost that is less than a cost to manufacture a mobile station that provides full capability to communicate in a session according to one of the aforementioned versions of IEEE Std. 802.11 or IEEE Std. 802.15. Accordingly, mobile stations may be manufactured to provide full capability for cellular communication, and sufficient capability of to communicate according to other wireless communication protocols for the purpose of obtaining information enabling estimation of a location of MS 107. However, such mobile stations may be manufactured without the expense and complexity of devices having full capability to communicate according to these other wireless protocols (e.g., with the full capability to establish and/or maintain a communication session in one of these other wireless communication protocols following an acquisition period).

Similarly, a receiver in a MS having a receiver and no transmitter may be adapted to obtain information enabling estimation of a location of the MS. Such an MS may comprise a device that is adapted to receive broadcast signals such as, for example, devices capable of acquiring broadcast signals transmitted in a format such as Digital TV, Digital Radio, DVB-H, DMB, ISDB-T and/or MediaFLO, just to name a few examples. As described above, such a MS may obtain such information from an acquisition process. However, the MS need not have sufficient processing resources (e.g., logic, memory, software, etc.) to process content in subsequently received broadcast signal carrying content (e.g., decode, decompress and/or render for presentation), for example. By not needing to process content in such a broadcast signal, such an MS may have reduced resources such as reduced memory resources, processor resources and/or decoders while still maintaining sufficient resources (e.g., hardware and software) to obtain a location estimate based upon stored acquisition information.

Figure 2:
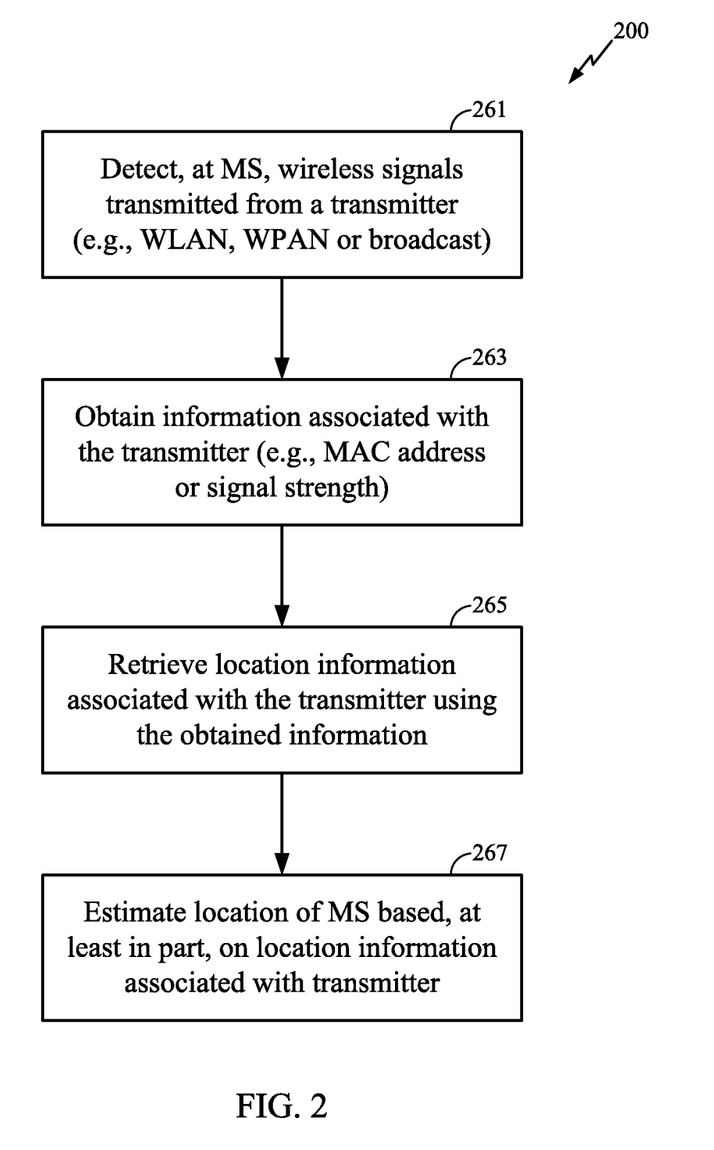
FIG. 2 is a flow diagram of a process to determine a location of a mobile station according to one aspect.

FIG. 2 is a flow diagram illustrating a process 200 for determining a location of a MS based, at least in part, on acquisition information obtained from a transmitter during an acquisition period, according to one particular implementation. At block 261, a MS may receive and detect wireless signals transmitted from a transmitter which is in proximity to the MS (e.g., a device in a WLAN or WPAN capable of communicating according to a wireless communication protocol such as versions of IEEE Std. 802.11 or IEEE Std. 802.15). Here, the MS may acquire sufficient information from the detected signal to successfully acquire the detected signal, enabling subsequent communication session according to a wireless communication protocol.

Block 263 may determine the identification information associated with the transmitter (e.g., the MAC address, or the base station ID) from received wireless signals. Here, for example, such identification may be obtained from acquisition information, which may be obtained during an acquisition process. Block 265 may retrieve location information associated with the transmitter (e.g., almanac of location information associated with devices in a WLAN and/or WPAN) using the identification information. For example, the mobile station may transmit identification information associated with the transmitter to a location server, which retrieves the location information associated with the transmitter using the identification information (e.g., from a database, or from another server, such as an almanac server). In another example, the MS may maintain location information associated with the transmitter in memory; thus, the location information may be retrieved from the memory of the MS. Block 267 may then estimate the location of the MS based, at least in part, on the retrieved location information associated with the transmitter.

Figure 3:
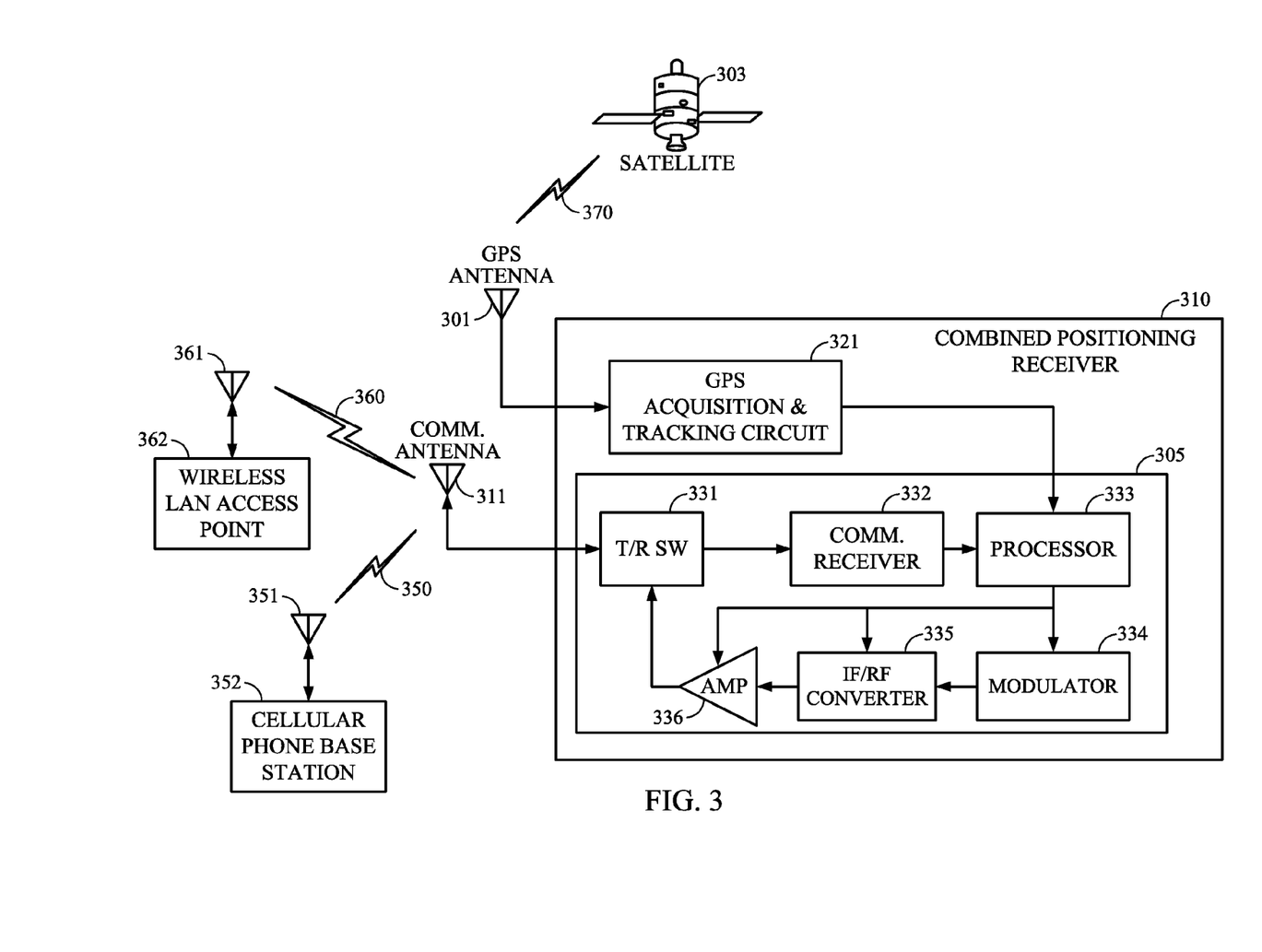
FIG. 3 is a schematic diagram of a receiver according to one implementation.

FIG. 3 is a schematic diagram of a receiver that is capable of communicating through wireless communication links according to more than one wireless communication protocol. In the particular illustrated example, receiver 310 comprises a combined GPS receiver and a communication transceiver 305. Here, communication transceiver 305 may be implemented as multiple receivers and transmitters for communication on wireless data links according to associated multiple wireless communication protocols. In the particularly illustrated example, communication transceiver 305 may include a transceiver portion for receiving cellular telephone signals from and/or transmitting cellular telephone signals to base station 352 according to one or more of the aforementioned cellular communication protocols while another transceiver portion is adapted for receiving information from and/or transmitting information to WLAN access point 362 according to one or more versions of IEEE Std. 802.11, for example. In alternative implementations, communication transceiver 305 may comprise a transceiver portion adapted for receiving information and/or transmitting information to a device in a WPAN in a communication link according to one or more versions of IEEE Std. 802.15. Acquisition and tracking circuit 321 is coupled to GPS antenna 301, and communication transceiver 305 is coupled to communication antenna 311. GPS signals (e.g., signal 370 transmitted from satellite 303) may be received through GPS antenna 301 and provided to acquisition and tracking circuit 321, which may then acquire PN (Pseudorandom Noise) codes for various satellites. Data produced by circuit 321 (e.g., correlation indicators) may be processed by processor 333 for transmission (e.g. of pseudorange measurements) by transceiver 305. While receiver 310 also contains a GPS receiver stage including acquisition and tracking circuit 321 to receive and process navigation signals 370 from satellite 303, as discussed above receiver 310 may be incapable of acquiring navigation signals 370 in certain environments.

Communication transceiver 305 comprises a transmit/receive switch 331 which routes communication signals (typically RF) to and from communication antenna 311 and transceiver 305. In some systems, a band splitting filter, or "duplexer," is used instead of the T/R switch. Received communication signals may be first processed at communication receiver 332, and then passed to processor 333 for further processing. Communication signals to be transmitted from processor 333 may be propagated to modulator 334 and frequency converter 335. Power amplifier 336 may increase the gain of the signal to an appropriate level for transmission to base station 352 (or to WLAN access point 362). In alternative embodiments (not shown), transmit circuitry (such as power amplifier 336, IF/RF converter and/or modulator 334) may be completely omitted to provide a low-cost, low-power and/or light-weight device that is capable of obtaining acquisition information in an acquisition process associated with a communication protocol for the purpose of obtaining an estimate of a location of the device.

In one particular implementation, receiver 310 may include (or be coupled to) a data processing system (e.g., a personal data assistant, or a portable computer). Here, such a data processing system may include a bus (not shown) which is coupled to a microprocessor and a memory (e.g., ROM, volatile RAM, non-volatile memory). The bus may interconnect various components together such as, for example, a display controller, display device and/or peripheral devices such as input/output (I/O) devices, which are well known in the art. In one implementation where receiver 310 is included as part of a MS, the MS may store locations and identifications (e.g., MAC address) of devices in a WLAN and/or WPAN for extracting and enhancing the location information associated with such devices using the memory and software program instructions stored in the memory. In one particular implementation, such a MS may only stores locations of the mobile station and identification of devices in a WLAN and/or WPAN for transmission to a server (e.g., through a communication port, or a wireless communication link) if a communication connection is established.

As illustrated above according to a particular example, communication transceiver 305 may communicate on wireless communication links 350 and 360 according to different wireless communication protocols. Implementing such capabilities in a MS may increase cost, weight, power consumption and/or form factor over implementing such capability for communication according to a single wireless communication protocol, for example. In one particular implementation, although claimed subject matter is not limited in this respect, communication transceiver 305 may have reduced capabilities to communicate in at least one wireless communication protocol, which may permit a reduction in cost, weight, power consumption and/or form factor associated with implementation in a MS. For example, communication transceiver 305 may comprise sufficient resources for obtaining acquisition information during an acquisition period for a signal transmitted according to a communication protocol (e.g., for the purpose of estimating the location of the MS), but may not comprise sufficient resources for establishing and/or maintaining a communication session according to the communication protocol following successful acquisition.

Figure 4:
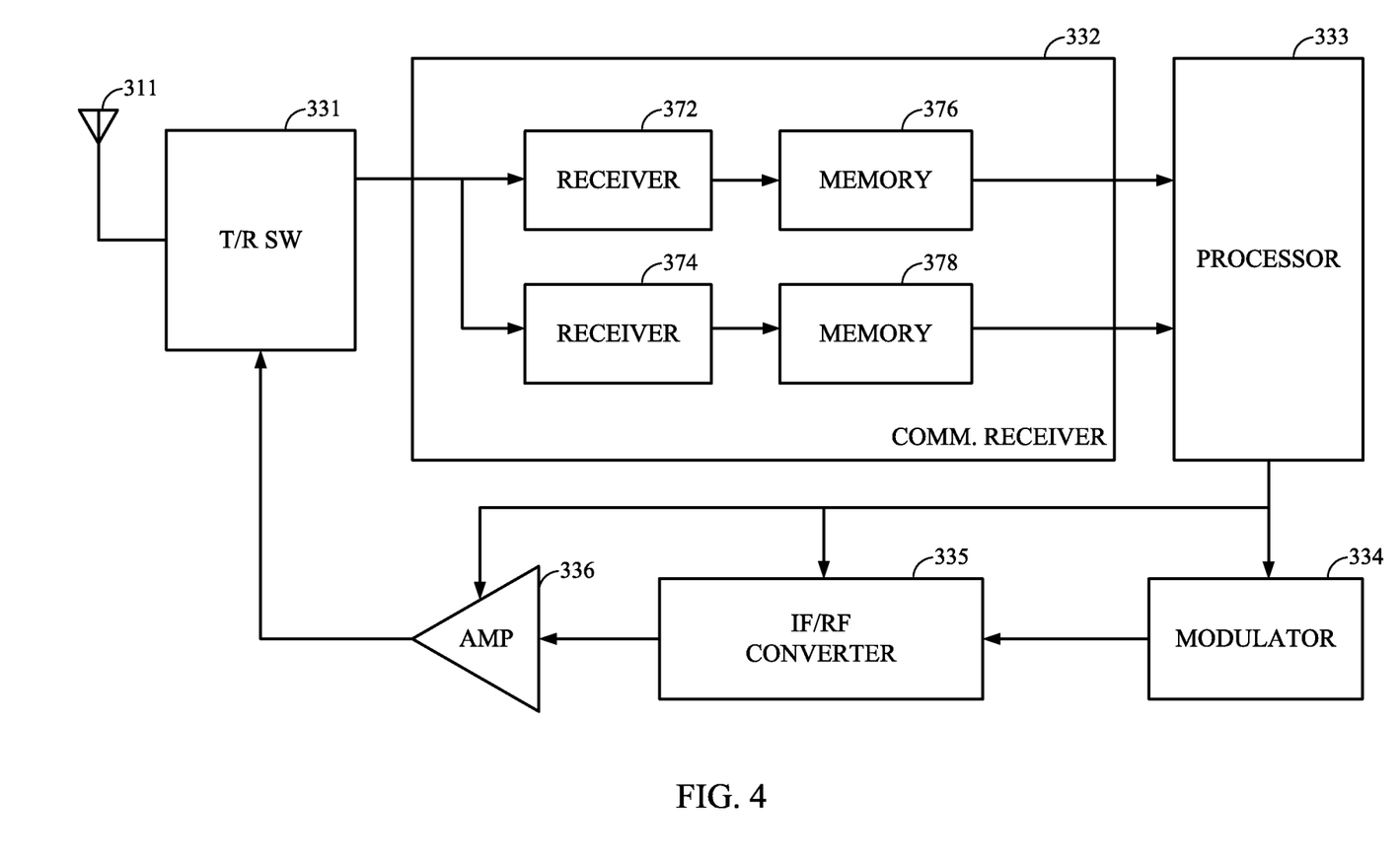
FIG. 4 is a schematic diagram of a receiver according to a particular alternative implementation.

FIG. 4. is a schematic diagram of a communication transceiver according to a particular implementation of communication transceiver 305 shown in FIG. 3. In this particular implementation, communication transceiver 305 may have reduced capabilities to communicate in at least one wireless communication protocol. Here, for example, communication transceiver 305 may comprise sufficient resources to obtain acquisition information provided in a signal received during an acquisition period according to a particular communication protocol (e.g., for the purpose of estimating the location of the MS), but may not include sufficient resources to establish and/or maintain a communication session in the particular communication protocol following successful acquisition. Such acquisition information obtained during an acquisition period may include, however, information uniquely identifying a transmitter that transmitted the acquired signal, which may then be used in estimating a location of a MS as illustrated above.

In this particular example, communication receiver 332 may include a first receiver 372 adapted to process signals transmitted according to a first wireless communication protocol (e.g., according to one or more of the aforementioned cellular communication protocols) while receiver 374 my be adapted to process signals transmitted according to a second wireless communication protocol (e.g., according one or more versions of IEEE Std. 802.11 or IEEE Std. 802.15 and/or the like). Here, receivers 372 and 374 may include, for example, filters, RF/IF demodulators/downconverters, A/D converters, decoders and/or the like adapted to process a signal received according to a particular communication protocol for providing digital information. Upon processing a received signal to provide such digital information, receivers 372 and 374 may store such digital information in an associated memory 376 or 378, which is accessible by processor 333, for example. Processor 333 may then retrieve the stored digital information further in support of one or more applications such as, for example, voice telephony, text messaging, location/position determination, applications implemented on a TCP/IP protocol and/or the like. As pointed out above, one or more applications may be supported by and/or used in connection with a communication session that is established between communication transceiver 305 and a wireless communication network.

In particular implementations, memories 376 and 378 may comprise any one of several mediums capable of storing information digitally such as, for example, random access memory (RAM). Here, memory 376 may be sufficiently large to enable establishing and/or maintaining a communication session following successful acquisition of a signal transmitted according to a first communication protocol (e.g., one of the aforementioned cellular communication protocols). Memory 378 may be sufficiently large enough to store acquisition information (e.g., MAC address) obtained during a process to acquire a signal transmitted according to a second communication protocol (e.g., versions of IEEE Std. 802.11 or IEEE Std. 802.15, etc.). However, the size of memory 378 may be insufficient to establish and/or maintain a communication session following successful acquisition of the signal transmitted according to the second communication protocol. In yet another implementation, a transmitter function of a MS may be completely removed to enable removal of components (e.g., transmit modulator, amplifier, filters and duplexers). Again, this may enable manufacture of a MS at a lower cost, weight, power consumption and/or form factor as pointed out above.

Processor 333 may comprise logic and/or processing circuitry adapted to process digital information retrieved from memories 376 and 378 according to encoded and/or software instructions. For example, processor 333 may include a microprocessor and/or microcontroller that is adapted to execute instructions stored in a memory (not shown). Such instructions may comprise, for example, procedures and/or modules adapted to enable and/or support one or more of the aforementioned applications. Here, for example, processor 333 may execute instructions to support and/or enable establishing and/or maintaining a communication session according to a first wireless communication protocol (e.g., associated with receiver 372). Also, processor 333 may include sufficient procedures and/or modules to process acquisition information obtained during a process to acquire a signal transmitted according to a second communication protocol (e.g., associated with receiver 374). In one particular implementation, however, processor 333 may not include sufficient procedures and/or modules to support and/or enable establishing and/or maintaining a communication session according to the second wireless communication protocol. Here, this may enable a reduction in memory required for storing instructions which are executable by processor 333 and/or a simplification of procedures and/or modules to be executed by processor 333 in support of MS functions.

In certain implementations, signals transmitted according to different wireless transmission protocols may be transmitted at different radio frequencies and/or modulated according to different, protocol-specific modulation schemes. As such, modulator 334 may be adapted to modulate an intermediate frequency (IF) signal according to a specific wireless communication protocol as determined by processor 333, for example. Likewise, IF/RF converter 335 may be adapted to convert an IF signal to an RF signal according to the specific wireless communication protocol as determined by processor 333. In one example implementation, obtaining acquisition information in a process to acquire a signal transmitted according to a communication protocol may not require transmission of information back to the source of the transmitted signal. As such, I/F converter 335 and/or modulator 334 may be simplified to be able to transmit information according to a first communication protocol (e.g., to support a communication session following successful acquisition of a signal transmitted according to the first communication protocol) but without the additional capability to transmit information according to a second communication protocol.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. An apparatus comprising:
 a receiver to process information transmitted according to a wireless communication protocol, said wireless communication protocol defining an acquisition period for transmission of acquisition information and a communication session to facilitate communication following a successful acquisition,
wherein the acquisition information comprises unique identification information associated with a device, a media access control (MAC) address associated with a device, or a measurement of received signal strength, and
wherein said receiver is capable of storing acquisition information transmitted during said acquisition period and does not comprise sufficient resources to establish and/or maintain said communication session following said successful acquisition.

2. The apparatus of claim 1, wherein said apparatus further comprises a processor to:
initiate said receiver to acquire said acquisition information during said acquisition period in response to an emergency event; and
initiate transmission of said stored acquisition information to a location server.

3. The apparatus of claim 1, and further comprising memory accessible by said receiver to store said acquisition information, wherein said memory accessible by said receiver is insufficient to enable said receiver to establish and/or maintain said communication session.

4. The apparatus of claim 1, and further comprising at least one transceiver to transmit and receive information according to a second wireless communication protocol different from said first communication protocol.

5. The apparatus of claim 4, wherein said at least one transceiver is to-transmit and receive information in a communication session defined by said second wireless communication protocol.

6. The apparatus of claim 1, wherein said wireless communication protocol comprises a wireless communication protocol according to a version of IEEE Std. 802.11 and/or IEEE Std. 802.15.

7. The apparatus of claim 1, wherein said receiver is capable of being manufactured at a cost lower than a cost to manufacture a receiver having sufficient resources to establish and/or maintain a communication session following a successful acquisition.

8. The apparatus of claim 1, wherein apparatus further comprises a processor to obtain an estimate of location of said receiver based, at least in part, on said stored acquisition information.

9. The apparatus of claim 1, wherein said apparatus does not include a transmitter to transmit information according to said communication protocol.

10. A mobile station comprising:
a receiver to process signal transmitted according to at least a first wireless communication protocol and a second wireless communication protocol, each of said first and second wireless communication protocols defining an associated acquisition period for transmission of acquisition information and an associated communication session to facilitate communication following a successful acquisition;
a transmitter to transmit signals transmitted according to at least said first wireless communication protocol; and
a processor to enable one or more applications using a communication session according to said first wireless communication protocol,
wherein said mobile station is capable of storing acquisition information received during said acquisition period defined by said second wireless communication protocol and does not have sufficient resources to establish and/or maintain said communication session defined by said second wireless communication protocol, and
wherein the acquisition information comprises unique identification information associated with a device, a media access control (MAC) address associated with a device, or a measurement of received signal strength.

11. The mobile station of claim 10, wherein said mobile station defines a memory accessible by said processor, wherein a portion of said memory allocated to processing information received according to said second wireless communication protocol is sufficient to store acquisition information received during an acquisition period of said second wireless communication protocol, and is not sufficient to establish and/or maintain a communication session according to said second wireless communication protocol.

12. The mobile station of claim 10, wherein said processor is to further execute encoded instructions stored in a memory to enable said one or more applications using a communication session according to said first wireless communication protocol, and wherein said mobile station does not include encoded instructions for establishing and/or maintaining a communication session according to said second wireless communication protocol.

13. The mobile station of claim 10, wherein said second wireless communication protocol comprises a wireless communication protocol according to a version of IEEE Std. 802.11 and/or IEEE Std. 802.15.

14. The mobile station of claim 10, wherein said mobile station is capable of being manufactured at a cost which is less than a cost to manufacture a mobile station having sufficient resources to establish and/or maintain said communication session defined by said second wireless communication protocol.

15. The mobile station of claim 10, wherein said processor is further to obtain an estimate of a location of said mobile station based, at least in part, on said stored acquisition information.

16. A processor comprising:
a memory having stored thereon encoded instructions to process information transmitted according to a first wireless communication protocol and a second wireless communication protocol, each of said first and second wireless communication protocols defining an associated acquisition period for transmission of acquisition information and an associated communication session to facilitate communication following a successful acquisition, said instructions comprising:
instructions to enable one or more applications using a communication session according to said first wireless communication protocol; and
instructions to store acquisition information received during said acquisition period defined by said second wireless communication protocol; and
circuitry, coupled to said memory, to retrieve and execute said instructions,
wherein said memory does not include instructions encoded instructions for establishing and/or maintaining a communication session according to said second wireless communication protocol and
wherein the acquisition information comprises unique identification information associated with a device, a media access control (MAC) address associated with a device, or a measurement of received signal strength.

17. The processor of claim 16, wherein said second wireless communication protocol is selected from the group wireless communication protocols comprising essentially of versions of IEEE Std. 802.11 and IEEE Std. 802.15.

18. The processor of claim 16, wherein said instructions further comprise instructions to obtain an estimate of a location of said processor based, at least in part on said stored acquisition information.

19. An apparatus comprising:
- a receiver to process information transmitted according to a wireless communication protocol, said wireless communication protocol defining an acquisition period for transmission of acquisition information to enable reception of a broadcast signal following a successful acquisition,
- wherein the acquisition information comprises unique identification information associated with a device, a media access control (MAC) address associated with a device, or a measurement of received signal strength, and
- wherein said receiver is capable of storing acquisition information transmitted during said acquisition period and does not comprise sufficient resources to process broadcast content in broadcast signal following said successful acquisition.

20. The apparatus of claim 19, wherein said receiver is further obtain an estimate of a location of said receiver based, at least in part, on said stored acquisition information.

21. The apparatus of claim 19, wherein said receiver is to receive said broadcast signal transmitted according to a Digital TV, Digital Radio, DVB-H, DMB, ISDB-T and/or MediaFLO format following said successful acquisition.

22. The apparatus of claim 19, wherein said apparatus further comprises a processor to:
- initiate said receiver to acquire said acquisition information during said acquisition period in response to an emergency event; and
- initiate transmission of said stored acquisition information to a location server.

* * * * *